United States Patent
Westgate et al.

(10) Patent No.: US 7,165,586 B2
(45) Date of Patent: Jan. 23, 2007

(54) PNEUMATIC TIRE WITH BLENDED COMPOSITE FIBER CORDS

(75) Inventors: Walter Kevin Westgate, Uniontown, OH (US); Robert John Gartland, Youngstown, OH (US); James Gregory Gillick, Akron, OH (US); Rene Francois Reuter, Burden (LU); Frank Schmitz, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 256 days.

(21) Appl. No.: 10/744,295

(22) Filed: Dec. 22, 2003

(65) Prior Publication Data

US 2005/0133137 A1 Jun. 23, 2005

(51) Int. Cl.
*B60C 9/00* (2006.01)
*B60C 9/02* (2006.01)
*B60C 9/18* (2006.01)
*D02G 3/48* (2006.01)

(52) U.S. Cl. .................. 152/451; 152/527; 152/556; 152/565; 57/902

(58) Field of Classification Search ............ None
See application file for complete search history.

(56) References Cited

U.S. PATENT DOCUMENTS 3,888,805 A * 6/1975 Van Gils et al. ........ 428/296.4
3,991,027 A * 11/1976 van Gils et al. ............ 524/510
4,024,895 A * 5/1977 Barron ................. 139/426 R
4,514,438 A * 4/1985 Gillberg-LaForce ........ 427/501
4,668,453 A    5/1987 Ebnesajjad et al. ........... 264/78
4,850,412 A * 7/1989 Gupta ........................ 152/556
5,221,384 A    6/1993 Takahashi et al. .......... 152/451

FOREIGN PATENT DOCUMENTS

| EP | 0355822 | | 2/1990 |
|----|---------|---|--------|
| GB | 1126126 | * | 9/1968 |
| JP | 68405401 | | 3/1985 |
| JP | 63315609 | * | 12/1988 |
| JP | 1321939 | | 12/1989 |
| JP | 1321940 | | 12/1989 |
| JP | 2260129 | | 11/1991 |
| JP | 6305304 | | 11/1994 |

OTHER PUBLICATIONS www.performancefibers.com—Beltec Fiber.*

* cited by examiner

*Primary Examiner*—Justin R. Fischer
(74) *Attorney, Agent, or Firm*—Nancy T. Krawczyk

(57) ABSTRACT

Disclosed is a tire having at least one reinforcing ply in the carcass, belt, or bead region of the tire. The reinforcing ply is comprised of a blended fiber cord. The cords, in combination with a preferred cure temperature adhesive, achieve a high degree of thermal stability allowing for the use of such cords in various reinforcing plies for a pneumatic tire and for preferred use for such cords in areas of the tire subject to high temperatures either in curing or performance.

19 Claims, 4 Drawing Sheets

PNEUMATIC TIRE WITH BLENDED COMPOSITE FIBER CORDS

FIELD OF THE INVENTION

The present invention relates to a pneumatic tire. More particular, the invention relates to a pneumatic tire wherein the cords used in reinforcing the tire are selected for endurance in extreme vulcanization conditions.

BACKGROUND OF THE INVENTION

Pneumatic tires are a composite of at least two primary materials: elastomer and fibers. The materials are combined to produce rubberized fibers used as reinforcement in the tire. The most common fibers in tires are polyester, rayon and nylon and are formed into cords prior to being incorporated into elastomers. The fiber cords give a tire its shape, size, stability, load carrying capacity, fatigue and bruise resistance, to name a few characteristics.

Fiber cords are used in all the different areas of the tire where reinforcement means are required: in the carcass as a reinforcing ply for the entire carcass or in sidewall regions; in the belt or breaker structures as primary reinforcing plies or as overlays or underlays; in the bead region as flipper or chipper plies. In the different areas of the tire, the fiber cord is relied upon to provide properties specific to that region of the tire. Thus, for each area of the tire, a single type of fiber may be treated or corded in numerous ways to provide different benefits.

Prior to being incorporated into elastomer, the fiber cord is adhesively treated to ensure bonding of the fiber to the elastomer. The selected adhesive is determined so as to be compatible with the fiber being used and to permit the fiber to remain bonded to the elastomer during curing and use of the tire. An adhesive selected for use with nylon fibers will not be compatible with polyester fibers due to the different chemical structure of the adhesive and the fiber.

In treating the fiber, there are three main variables to consider: time, temperature, and tension. Each of these variables is optimized depending upon the type of fiber cord being treated, i.e. nylon versus rayon versus aramid, and the adhesive being used to create bonding between the elastomer and fiber. The time must be sufficient to allow the adhesive to bond with the fiber and set; the temperature must be sufficient to activate the adhesive; and the tension must be sufficient to ensure penetration of the adhesive, permit the fiber to move through the processing unit, and develop the requisite physical properties such as modulus and shrinkage that are required.

In selecting a fiber cord for reinforcing a tire, the cord properties are selected to achieve desired goals. When different properties are desired and a single fiber type cannot provide the desired characteristics to the tire, different materials may be combined. A reinforcement ply may use alternating types of parallel cords. Hybrid cords, wherein two types of fibers are twisted together are also known.

Core/sheath types of filaments are also known. In a conventional core/sheath type of filament, such as that disclosed by U.S. Pat. No. 5,221,384 (Takahashi), the sheath is a polyamide sheath and a polyester core, with a sheath/core cross-sectional ratio of 90:10 to 10:90 down to 70:30 to 30:70. In such a cord, one skilled in the art recognizes that a true core/sheath filament exists by the resultant properties of the filament. For example, if the Takahashi filament is 10% sheath of polyamide and 90% core of polyester, the resulting properties typically follow the rules of a mixture whereby the 10% of one property of the polyamide is added to 90% of the property of the polyester. A core/sheath filament is formed through high speed spinning wherein the two different materials are spun through nested openings in the spinneret and taking advantage of die swell for the two different materials to contact and bond during orientation of the filament.

SUMMARY OF THE INVENTION

The present invention is directed to a blended fiber cord used for reinforcing tires and pneumatic tires comprising such cords. The cords, in combination with a preferred adhesive, achieve a high degree of thermal stability allowing for the use of such cords in various reinforcing plies for a pneumatic tire and for preferred use for such cords in areas of the tire subject to high temperatures either in curing or performance.

Disclosed is a pneumatic tire comprising a carcass reinforcing structure, a tread, a belt structure overlaying the carcass reinforcing structure located radially inward of the tread. The carcass reinforcing structure and the belt structure are each comprised of at least one cord reinforced elastomeric ply. The cord reinforced elastomeric ply of either the carcass reinforcing structure or the belt structure is comprised of a blended composite filament. The cords formed of blended composite filaments are coated with an adhesive having a cure set temperature greater than 470° F. (243° C.).

The blended composite filament used to form the reinforcing cords in the pneumatic tire is formed of two materials, a primary material and a secondary material. The filament may be described as having an inner cross-sectional area and an outer cross sectional area, the radially outermost portion of the outer cross sectional area forming the surface of the filament. The primary material is predominately located in the inner cross-sectional area of the filament while the secondary material is predominately located in the outer cross-sectional area of the filament. However, neither cross-sectional area has a homogeneous composition of just one of the two materials, but each cross-sectional area is a different blend ratio of the two materials. Preferably, the primary material is a polyester and the secondary material is a polyamide. The ratio of the primary material to the secondary material is in at least 90:10, with a preferred ratio of at about 95:5.

The adhesive used to treat the cords formed of the blended composite filaments is a high temperature curing polyester compatible adhesive. Any adhesive that has a curing temperature greater than 470° is suitable. While conventional polyester adhesives have a lower curing temperature, the higher curing temperature enables the cord to achieve better than expected results in regard to thermal stability.

In one disclosed aspect of the invention, the linear density of the cords is in the range of 210 to 5000 dTex. The cords can have any conventional textile cord construction. Such cord constructions for pneumatic tire include, but are not limited to, 440/1, 550/1, 940/1, 700/1, 1100/1/2, 1440/1/3, 2200/1/2, 3000/3, 1440/2/2.

In another aspect of the invention, the cord comprising of the blended composite filaments is the reinforcement means in a carcass reinforcing structure ply. The carcass ply between the bead portions of the tire. The carcass reinforcing structure may have multiple plies of the blended composite filament cords. The cords used in the carcass may be inclined at angles of 75°–90° relative to an equatorial plane of the tire, forming a radial tire. Alternatively, the cords of the carcass plies may be inclined at angles of 25° to 65° relative to an equatorial plane of the tire, forming a bias tire.

Alternatively, any tire formed used cords formed of the blended composite filament may be a self-supporting tire. Such a tire has a pair of opposing sidewalls reinforced by at least one elastomeric insert in each of the opposing sidewalls. The elastomeric insert in each sidewall enables the tire to operate in a reduced pressure condition.

In another aspect of the invention, the elastomeric ply comprising cords formed of the blended composite filaments are part of the belt structure. When used in the belt structure, the cords may be inclined at angles of 10° to 35° relative to an equatorial plane of the tire. Alternatively, the cords may be inclined at angles of not more than 5° relative to an equatorial plane of the tire, forming an overlay ply. The small inclination angle ply may be located radially outward, inward, or between other belt plies.

In still another aspect of the invention, each bead portion of the tire may comprises at least one reinforcing layer, in addition to any carcass reinforcing ply that extends between the opposing bead portions. The bead reinforcing layer is comprised of cords formed from the blended composite filaments and treated with an adhesive having a cure set temperature greater than 470° F. (243° C.).

DEFINITIONS

The following definitions are controlling for the disclosed invention.

"Apex" means an elastomeric filler located radially above the bead core and between the plies and the turnup ply.

"Annular" means formed like a ring.

"Aspect ratio" means the ratio of its section height to its section width.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25°–65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Circumferential" means lines or directions extending along the perimeter of the surface of the annular tire parallel to the Equatorial Plane (EP) and perpendicular to the axial direction.

"Cord" means one of the reinforcement strands of which the plies of the tire are comprised.

"Cord angle" means the acute angle, left or right in a plan view of the tire, formed by a cord with respect to the equatorial plane. The "cord angle" is measured in a cured but uninflated tire.

"Denier" means the weight in grams per 9000 meters (unit for expressing linear density). Dtex means the weight in grams per 10,000 meters.

"Elastomer" means a resilient material capable of recovering size and shape after deformation.

"Equatorial plane (EP)" means the plane perpendicular to the tire's axis of rotation and passing through the center of its tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Inner" means toward the inside of the tire and "outer" means toward its exterior.

"LASE" is load at specified elongation.

"Lateral" means an axial direction.

"Lay length" means the distance at which a twisted filament or strand travels to make a 360° rotation about another filament or strand.

"Polyester" means any polymer synthesized from the polycondensation of a diol and a dicarboxylic acid.

"Radial" and "radially" are used to mean directions radially toward or away from the axis of rotation of the tire.

"Sidewall" means that portion of a tire between the tread and the bead.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Tread" means a molded rubber component which, when bonded to a tire casing, includes that portion of the tire that comes into contact with the road when the tire is normally inflated and under normal load.

"Yarn" is a generic term for a continuous strand of textile fibers or filaments. Yarn occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
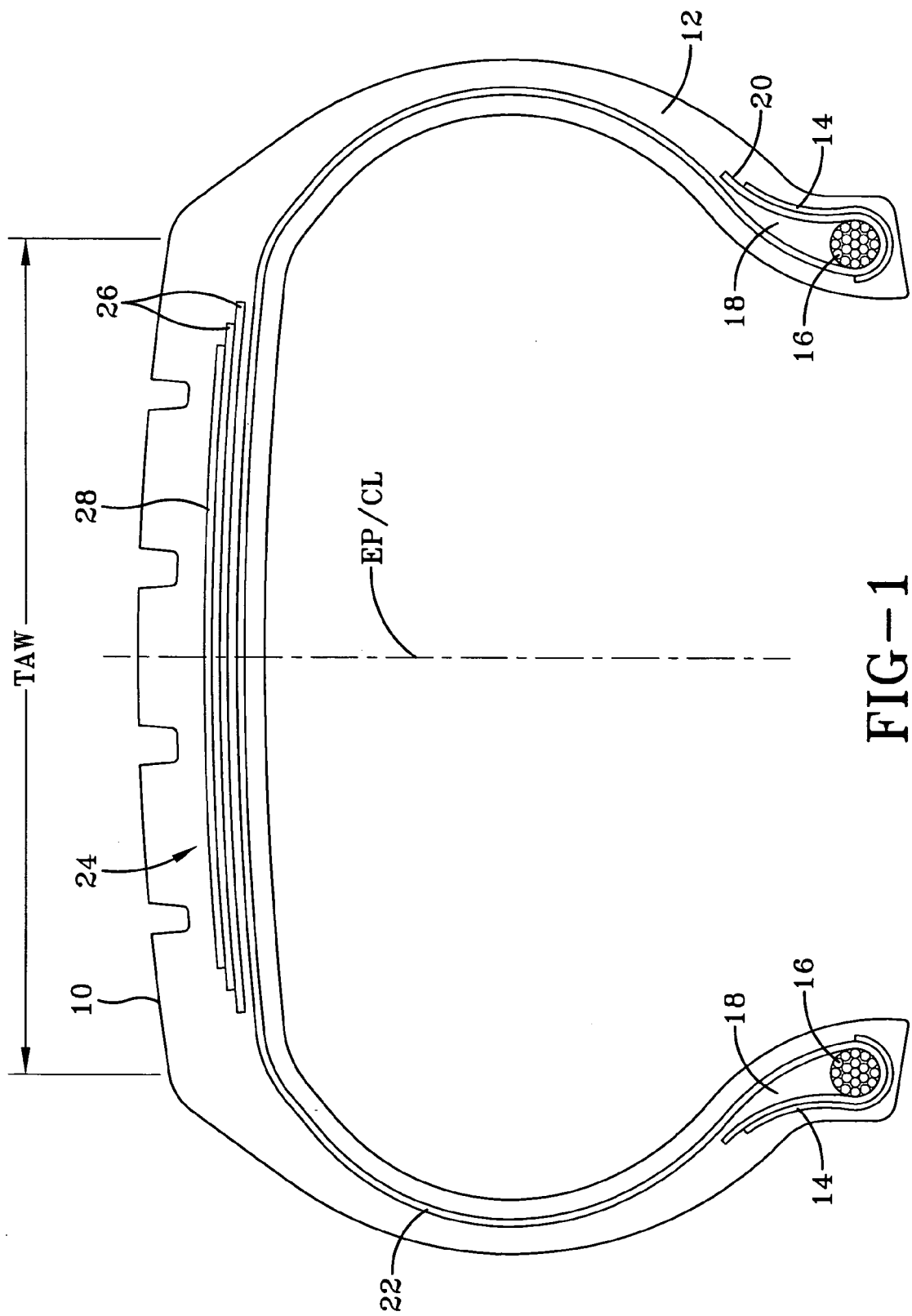
FIG. 1 is a cross sectional view of a pneumatic tire.

FIG. 1 illustrates a tire according to the present invention. The tire has an aspect ratio of less than 0.80. The tire has a tread 10 with sidewall portions 12 connected to and extending from the lateral edges of the tread 10. At the radially inner ends of each sidewall 12 is a bead portion. Each bead portion has therein a bead core 16, an apex 18 extending radially outward from the bead core 16, and may have at least one reinforcing chafer layer 14 to reduce rim chafing of the tire. A carcass reinforcing ply structure 22 extends from one bead portion to the opposing bead structure with turnup portions 20 and may be formed from multiple plies.

Outward of the carcass is a belt structure 24. The belt structure 24 has at least two plies 26 of cords, the cords being inclined at an angle of 10° to 35°. The cords in each ply 26 are parallel to each other and crossed relative to the cords in the adjacent layer. The type of material forming the cords of the belt plies 26 is dependent upon the end use of the tire. For a typical passenger or light truck tire, of the type illustrated in FIG. 1, which typically has an aspect ratio of 0.80 to 0.50, the belt cords are metallic.

The belt structure 24 also includes an overlay ply 28. The overlay ply 28 is illustrated as being located radially outward of the belt plies 26, but such a ply may be located radially inward of the belt plies 26 or between the plies 26. The overlay ply 28 is formed of cords inclined at about zero to 5° degrees relative to the equatorial plane of the tire. The inclination angle of the cords is partially dependent upon the formation and application method of the overlay ply. The overlay ply 28 may be spirally wound onto the tire building machine—with spiral winding of a single elastomeric encased cord or an elastomeric ribbon of multiple cords having a width of 5 to 30 mm and a cord density in the range of about 10 to about 50 ends per inch (25.4 to 130 end per cm). The overlay ply 28 may also be a cut ply of parallel cords. A spirally wound layer will have a greater inclination angle relative to the equatorial plane than a cut ply of parallel cords. Additionally, depending upon the type of cord being used, the cords of the overlay ply 28 may be cut so as to have longitudinal lengths less than the circumferential length of the tire. If so cut, the cuts of adjacent cords or sections of cords should be staggered across the lateral width of the tire.

While not illustrated in the tire, but conventionally known, the tire may be constructed as a self-supporting runflat tire. In such a tire, in each sidewall 12, at least one hard rubber lenticular shaped insert is provided. The insert becomes load bearing when the tire is operated in under inflated conditions.

For the tire of FIG. 1, i.e. a passenger or light truck tire, cords in various plies of the tire may be formed of a blended filament of the type disclosed herein. Such plies may be, but are not limited to, the carcass reinforcing plies 22, the bead reinforcing plies such as the chipper 14, or the overlay ply 28.

Figure 2:
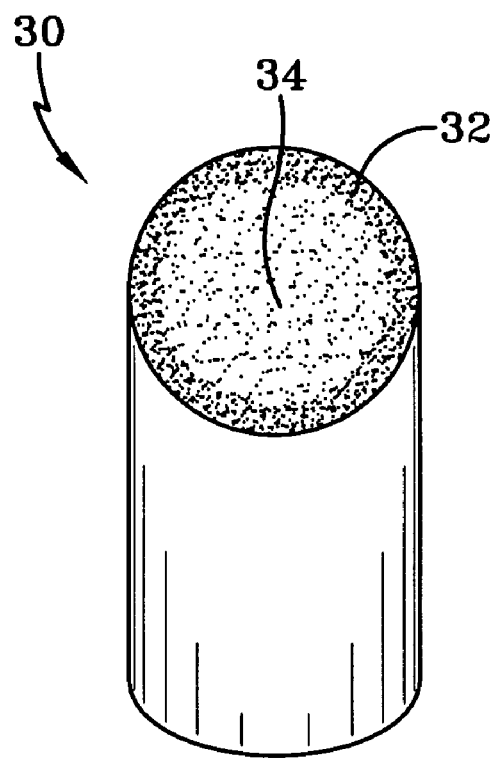
FIG. 2 is a cross sectional view of a filament.
Figure 3:
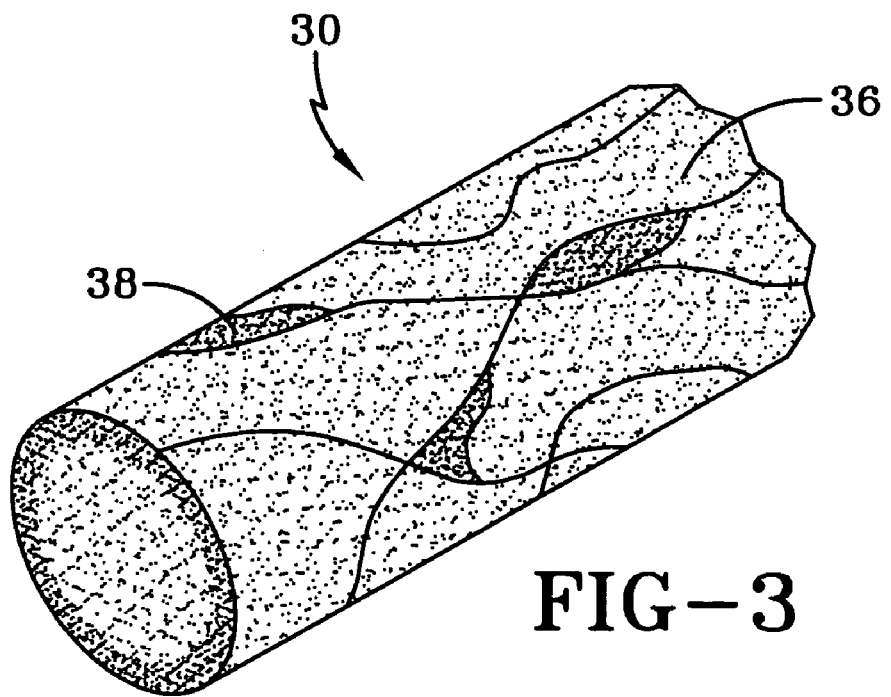
FIG. 3 is a perspective view of the blended filament.

The blended filament 30 used in the present invention has a structure wherein neither the outer cross sectional area 32 nor the inner cross sectional area, or interior, 34 of the filament 30 is a homogenous material, but each is a blend of two different materials 36, 38, see FIGS. 2 and 3. As there is no clear distinction between the material types at the filament surface 32 or the filament interior 34, there is no clear core or sheath construction to the filament 30. The filament 30 is achieved by blending a primary material 36 with a defined amount of a secondary material 38 during the blending of the primary material 36. The amount of the secondary material blended with the primary is not more than 10% and is preferably 5% or less, by volume, of the total material blend.

During high speed spinning of the material blend through a conventional spinneret design having single ports, the majority of the secondary material 38 diffuses to the surface of the filament 30. After spinning, the surface 32 of the filament 30 is not completely formed from the secondary material 38 nor is the interior 34 of the filament completely formed from the primary material 36, but each filament cross sectional area is a blend of both materials 36,38. However, there is a preferred concentration of the second material 38 at the outer cross sectional area 32 of the filament 30 and a preferred concentration of the primary material 36 at the inner cross sectional area 34 of the filament 30.

The preferred primary material 36 is a polyester material, while the secondary material 38 is a polyamide material. The polyester material may be any conventional polyester material such as, but not limited to, polyethylene terephthalate. The polyamide material may be any conventional polyamide material and includes aliphatic polyamide polymers such as, but not limited to, polyhexamethylene adipamide (nylon 66), polycaprolactam (nylon 6), polybutyrolactam (nylon 4), poly(9-aminononanoic acid) (nylon 9), polyenantholactam (nylon 7), polycapryllactam (nylon 8), polyhexamethylene sebacamide (nylon 6, 10), and the like, or blends thereof such as nylon 6,66 and also includes highly aromatic polyamides that are derived from p-phenylenediamine and terephthaloyl chloride and are long chain synthetic aromatic polyamide in which at least 85% of the amide linkages are attached directly to the two aromatic rings.

In the blended filament of the present invention, during testing of the filament, the inventors do not see the same compromised properties as with a core/sheath filament. The resulting properties of the filament 30 are not a ratio composite based on the two materials 36, 38 forming the filament 30 but are instead reflective of what those skilled in the art would expect with a pure material forming the filament 30, see Table 1.

TABLE 1

Cord Properties

| | Blended Fiber | Polyamide (nylon 6,6) | Polyester |
|---|---|---|---|
| Cord Configuration | 1100/1/2 dtex 472Z × 472S | 940/1/2 dtex 472Z × 472S | 1100/1/2 dtex 472Z × 472s |
| Breaking Load (N) | 122.1 | 154.1 | 145.6 |
| Ultimate elongation (%) | 17.6 | 23.2 | 16.1 |
| Shrinkage (%) | 2.7 | 9.5 | 12.8 |
| Initial Modulus MPa | 5152 | 2967 | 5561 |
| Thermal Stability, % retained BL | 96% | 41% | 70% |
| Chemical Stability, % retained BL | 71% | 99% | 61% |
| Heat Resistance, % retained BL | 100% | 93% | 97% |
| LASE, 5% | 45 | 25 | 49 |

One area in which the inventors saw a difference with the blended filament in comparison to the conventional polyamide and polyester cords is in the area of thermal stability. A significant increase in thermal stability was seen for the blended filament in comparison to the either the polyester filament or the polyamide filament, see Table 1. The thermal stability test performed exposed the filament to extreme thermal conditions of 191° C. for 6 hours. The thermal stability test determines how a cord will perform during long cure cycles such as those experienced in curing off the road and agricultural type tires. Such a test differs from a typical shrinkage test where the cord is exposed to an elevated temperature of 177° C. for 2 minutes.

The other surprising aspect of the blended filament is the adhesive mechanism required for the filament. For a conventional sheath/core filament of the prior art, the adhesive selected would be one that is blended to adhere to the sheath component of the filament. For example, for an aramid sheath/polyester core filament, the appropriate adhesive is an aramid adhesive; i.e. an adhesive blended to bond to an aramid filament and enable adhesion with an elastomer.

With the present filament, a nylon adhesive, chosen to correspond to the predominate outer cross sectional area material, i.e. the secondary filament material, was first chosen and tested. However, contrary to expectations, the nylon adhesive failed to yield the necessary adhesion properties. A conventional polyester adhesive, chosen to correspond to the primary filament material, was then selected. When cured at a typical polyester adhesive cure temperature, not greater than 470° F. (245° C.), the desired adhesion properties were not achieved. A second polyester adhesive was selected; the second adhesive having a set temperature greater than 470° F. (245° C.). The desired properties were then achieved.

The results of adhesive testing are set forth below. The nylon adhesive is a conventional commercial nylon adhesive having a conventional cure temperature of 450° F. (232° C.). The first polyester adhesive is also a commercial adhesive having a cure temperature of 470° F. (243° C.). The third adhesive used is another polyester adhesive but having a cure temperature of 480° F. (249° C.). Blend filament cords were treated with adhesive and embedded in a conventional ply compound, creating strips of calendered cords. The calendered cords were then subjected to a peel force test. As noted above, the blended cords treated with a nylon adhesive and a conventional cure temperature polyester adhesive exhibited inferior adhesion in comparison to the high curing temperature polyester adhesive.

TABLE 2

Adhesive Comparison

| Adhesive Type | Nylon | Polyester | Polyester |
|---|---|---|---|
| Set Temperature of Adhesive | 450° F. | 470° F. | 480° F. |
| Adhesion Peel Force, N | 89 | 68 | 127 |

The results of the adhesion testing further evidenced to the inventors that the blended filament is not a simple core/sheath filament as the most likely adhesive failed to yield satisfactory results. The best adhesive was a high cure temperature polyester adhesive. The inventors concluded, along with the other test data, that the blended filament has a polyester at the filament surface, in addition to the polyamide.

The blended cords were also evaluated with static strip adhesion samples against nylon 6,6 cords. The blended cords having a construction of 1100/1/2 dtex 6.5/6.5 were treated with two different adhesives; one adhesive cured at 450°/460° F. and the second adhesive cured at 480° F. The nylon cords had a construction of 940/2 dtex 10/12 and were treated with a nylon adhesive with a 450°/460° F. cure temperature. The cords were treated in a similar manner with the noted different adhesives and then calendered with identical ply coat compounds. The adhesion samples were cured as follows:

32 minutes at 150° C. (32 Cure Equivalents (CEQ))
77 minutes at 160° C. (140 CEQ)
137 minutes at 160° C. (250 CEQ)
44 minutes at 180° C. (250 CEQ).

After curing the adhesion samples were stripped and the rubber coverage was observed.

Figure 5:
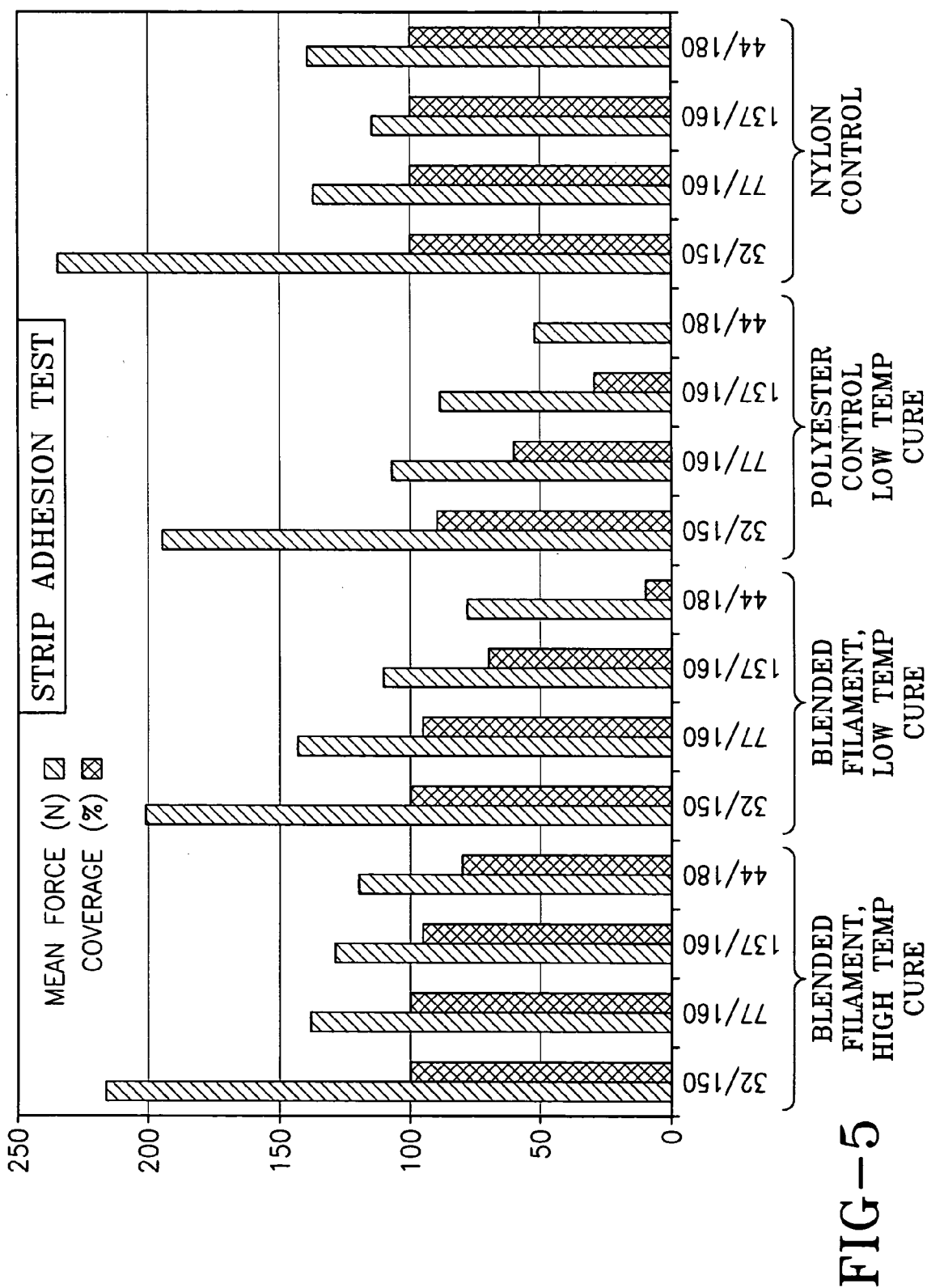
FIG. 5 is a chart showing the results of a strip adhesion test.

FIG. 5 shows a graph of the test results. The nylon 6,6 cord control strip has 100% rubber coverage, indicating a strong fiber/dip/coat adhesion even at high cure temperatures. The drop of strip force with increasing cure equivalents is most likely due to rubber degradation rather than adhesive failure. The polyester cord control strip, using a conventional low temperature cure adhesive shows lower strip force than the nylon, and the rubber coverage decreases with increased cure equivalents. In comparison, the blended filament cords treated with a high temperature curing adhesive show strip forces comparable to the nylon 6,6 and significantly greater strip forces than the polyester cords. The rubber coverage for the blended filament cord just drops slightly after a 250 CEQ cure, and is also improved over the polyester control cord. The blended cord treated with the lower curing temperature adhesive shows inferior adhesion at higher cure equivalents.

The increased thermal stability in comparison to polyester or polyamide materials taken in combination with the comparable adhesive properties in comparison to conventional nylon 6,6 give rise to the use of the blended filament in different aspects of the tire that are currently being constructed with either polyamide or polyester.

Using the blended filament, yarns and cords of any suitable size may be manufactured to reinforced pneumatic tires. To produce cords suitable for tire construction, the typical linear density of a yarn bundle (which contains multiple filaments) is 210 to 5000 dTex. The yarns may be then formed into any conventional cord constructions, such as 700/1 or 1100/1/2 for passenger tire, 1100/1/2, 1440/1/3 or 2200/1/2 for light truck tires, 440/1, 550/1, 3000/3 for radial medium truck tires, 1100/1/2, 1440/2/2 or 1440/1/3 for off-the-road or farm tires.

The cords formed from the blended filaments 30 may be used in any area of the tire. The cords may form the carcass reinforcing plies of the tire, may be the belt reinforcing plies or the overlay or underlay plies. The properties of the cord also lend itself for use in chippers, flippers, or sidewall reinforcing plies.

The tire employing the blended filament cords may be a conventional tire, a self-supporting run-flat tire, or other type of run-flat tire (such as the PAX System). In run-flat tires, under run-flat conditions, the tire is subjected to additional stress resulting in heat build-up in the tire components. In such a circumstance, a conventional polyester will degrade due to this increased heat build-up. The blended filament cord, due to the increased thermal stability of the cord, resists degradation during run-flat operations.

Also because of the increased thermal stability of such cords, cords formed of the blended filament are also suitable for carcass or breaker plies in bias tire applications. Such tires include aircraft tires, some race tires, medium truck tires, off-the-road tires, and agricultural tires.

Figure 4:
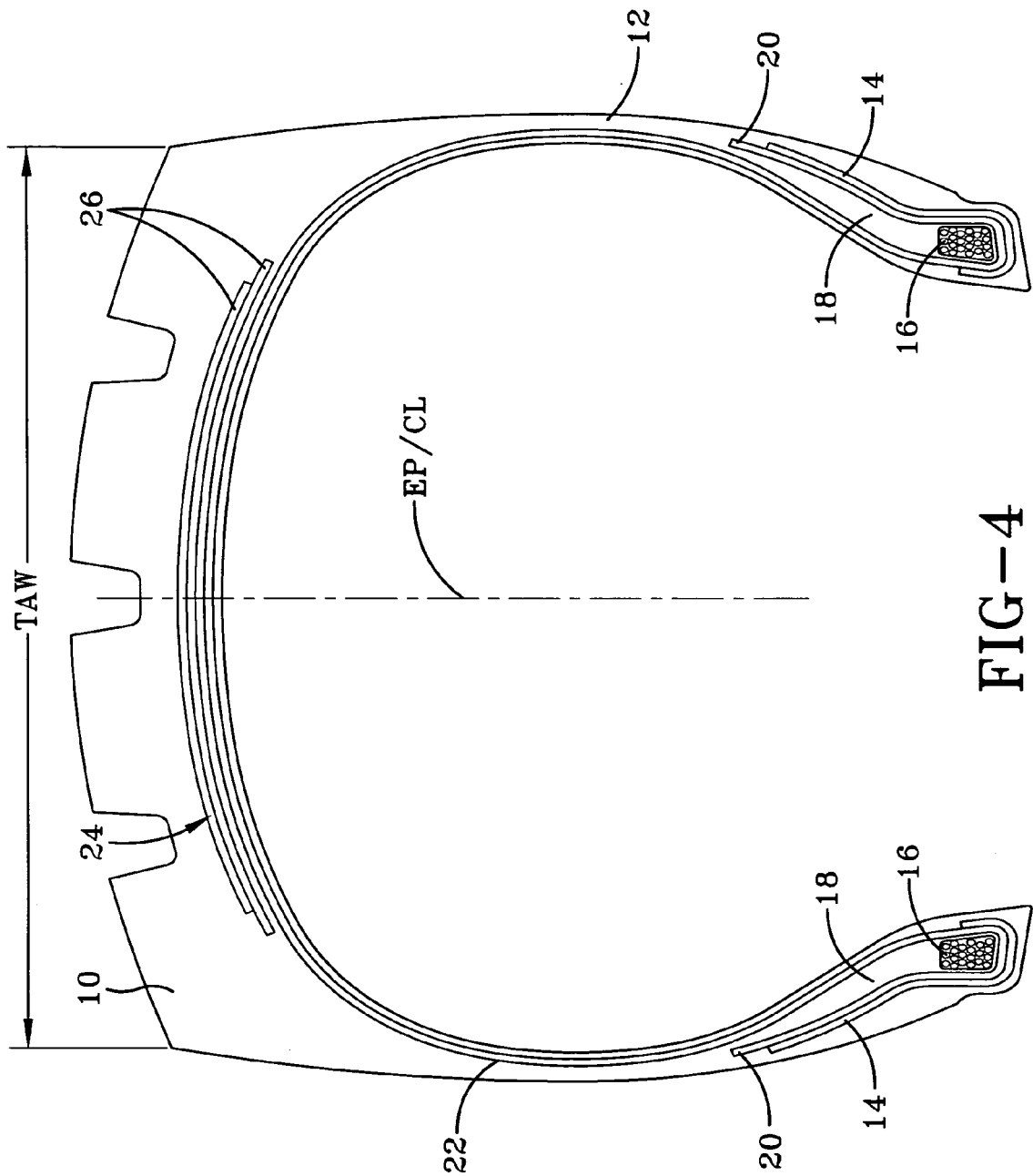
FIG. 4 is a cross sectional view of another pneumatic tire.

FIG. 4 illustrates an agricultural tire. Elements similar to the passenger tire of FIG. 1 have similar reference numerals. The tire has a relatively high aspect ratio. The tire has a tread 10, the tread 10 being noticeably thicker than the tread 10 of the passenger tire of FIG. 1. Sidewall portions 12 extend from the edges of the tread 10. At the radially inner end of each sidewall 12 is a bead portion. Each bead portion has therein a bead core 16, an apex 18, and a reinforcing chafer layer 14. A carcass reinforcing ply structure 22 extends from one bead portion to the opposing bead structure with turnup portions 20 located axially outward. The carcass reinforcing ply structure 22 may be formed of multiple plies, and the cords in the plies may be radially or bias oriented. A majority of off-road tires manufactured are bias ply tires, indicating the cords of the carcass ply are inclined at angles of 25° to 65° relative to the equatorial plane of the tire. Radially outward of the carcass is a belt structure 24 of multiple plies 26. The inclination angle of the cord in the plies 26 is dependent upon the carcass ply cord inclination angles and the tire engineers intent.

As the blended filament cords exhibit excellent thermal stability and peel force and coverage, it is believed that blended filament cords are well suited for reinforcement means in large sized tires that are subjected to relatively longer cure times and higher cure temperatures. Cords suitable for use as belt ply reinforcing cords for radial farm tires were prepared. The different cords were treated with the noted adhesives, all of the adhesives being applied in a like manner to the cords and tested. Test results are seen in Table 3.

TABLE 3

Cords for Radial Farm Tire Comparison

| Tire | Control | A | B |
|---|---|---|---|
| Cord Structure | Polyester 1100/2 dtex 6.5/6.5 | Blended Filament 1100/1/2 dtex 6.5/6.5 | Blended Filament 1100/1/2 dtex 6.5/6.5 |
| Adhesive Used | Polyester adhesive | Polyester adhesive | Polyester adhesive |
| Adhesive Cure Temp | 450/460° F. | 450/460° F. | 480° F. |
| Break Strength*, original, N | 159.9 | 138.8 | 145.6 |
| Thermal Stability, % | 76 | 73 | 87 |
| Permanent Shrinkage (%) | 2.96 | 2.4 | 2.56 |

*Firestone Flex Test

The cords were also tested for use in overlays for passenger tires. A conventional radial belted passenger tire, size 235/55R18, incorporated a single overlay ply of blended cords inclined at approximately zero degree to the tire centerline. After curing, the tire was tested and compared to a conventional tire using a polyamide overlay. Test results are seen in Table 4.

TABLE 4

Passenger Tire Overlay Comparison

| Tire | Control | A | B | C |
|---|---|---|---|---|
| Overlay Construction | Nylon 6,6 940/1/2 dtex 12 × 12 | Blended fiber 1100/1/2 dtex 5 × 5 | Blended fiber 1100/1/2 dtex 0 × 5 | Blended fiber 1100/1/2 dtex 12 × 12 |

TABLE 4-continued

Passenger Tire Overlay Comparison

| Tire | Control | A | B | C |
|---|---|---|---|---|
| Flat Spotting | 100 | 100 | 100 | 100 |
| Wet Handling: | | | | |
| Avg lap time (s), | 56.2 | 55.5 | 56.0 | 55.9 |
| Under/over steer, | 3 | 3.125 | 3 | 3.125 |
| Controllability | 3 | 3.125 | 3.125 | 3.125 |
| DOT Endurance, miles | 7012 | 7679 | 7146 | 8170 |
| Passby Noise @ 55 kph, dB | 66.30 | 66.86 | 66.48 | 66.64 |

Flatspotting is reported with the nylon 6,6 overlay as the control tire having a rating of 100. For wet handling, the rating of 3 is a control rating with the performance of the blended filament cords compared to the nylon 6,6 cords.

While not presented in the above Table, the tires using the different blended filaments maintained a reduced mean tread surface temperature, on the average of approximately 10° F. less than for the tires constructed with a nylon 6,6 overlay. Thus the blended filament cord provides comparable tire performance in some areas of testing, reduced tire temperatures and improved DOT endurance.

Based on the testing and results, the blended filament is suitable for various reinforcements in different types of tires, both radial and bias and may be used in any portion of the tire.

What is claimed is:

1. A pneumatic tire comprising a carcass reinforcing structure, a tread, a belt structure overlaying the carcass reinforcing structure located radially inward of the tread, wherein the carcass reinforcing structure and the belt structure are each comprised of at least one cord reinforced elastomeric ply, the tire being characterized by
the at least one cord reinforced elastomeric ply of either the carcass reinforcing structure or the belt structure is comprised of a blended composite filament, wherein throughout a cross-section of the filament, the filament is a non-homogenous blend of a primary material and a secondary material wherein the primary material is predominately located in the inner cross-sectional area of the filament and the secondary material is predominately located in the outer cross-sectional area of the filament, and the cords are coated with an adhesive formulated to be compatible with the primary material, the adhesive having a cure set temperature greater than 470° F. (243° C.).

2. The pneumatic tire of claim 1 wherein the primary material is a polyester and the secondary material is a polyamide.

3. The pneumatic tire of claim 2 wherein the primary material is polyethylene terephthalate and secondary material is selected from the group consisting of polyhexamethylene adipamide (nylon 66), polycaprolactam (nylon 6), polybutyrolactam (nylon 4), poly(9-aminononanoic acid) (nylon 9), polyenantholactam (nylon 7), polycapryllactam (nylon 8), polyhexamethylene sebacamide (nylon 6, 10), nylon 6,66, highly aromatic polyamides that are derived from p-phenylenediamine and terephthaloyl chloride, long chain synthetic aromatic polyamide in which at least 85% of the amide linkages are attached directly to the two aromatic rings, and blends of any of the previous.

4. The pneumatic tire of claim 1 wherein the adhesive is a polyester compatible adhesive.

5. The pneumatic tire of claim 1 wherein the filaments have not more than 10% by volume of the secondary material.

6. The pneumatic tire of claim 1 wherein the filaments have 5% or less by volume of the secondary material.

7. The pneumatic tire of claim 1 wherein the surface of the blended composite filament is formed from two different polymers.

8. The pneumatic tire of claim 1 wherein the linear density of the cords is in the range of 210 to 5000 dTex.

9. The pneumatic tire of claim 1 wherein the cord has a cord construction selected from the group consisting of 440/1, 550/1, 940/1, 700/1, 1100/1/2, 1440/1/3, 2200/1/2, 2000/2, 1440/2/2.

10. The pneumatic tire of claim 1 wherein the at least one cord reinforced elastomeric ply is part of the carcass reinforcing structure and extends between the bead portions of the tire.

11. The pneumatic tire of claim 10 wherein the carcass reinforcing structure has two plies of the cord reinforced elastomeric ply.

12. The pneumatic tire of claim 10 wherein the cords of the at least one cord reinforced elastomeric ply are inclined at angles of 75°–90° relative to an equatorial plane of the tire.

13. The pneumatic tire of claim 10 wherein the cords of the at least one cord reinforced elastomeric ply are inclined at angles of 25° to 65° relative to an equatorial plane of the tire.

14. The pneumatic tire of claim 10 wherein the tire is a self-supporting tire, the tire further comprising a pair of opposing sidewalls, the radially inner ends of the sidewalls terminating in bead portions, and the at least one cord reinforced elastomeric ply extending through the opposing sidewalls, and at least one elastomeric insert in each of the opposing sidewalls, the elastomeric insert in each sidewall enabling the tire to operate in a reduced pressure condition.

15. The pneumatic tire of claim 1 wherein the at least one cord reinforced elastomeric ply is part of the belt structure.

16. The pneumatic tire of claim 15 wherein the cords in the at least one cord reinforced elastomeric ply are parallel cords inclined at an angle of 10° to 35° relative to an equatorial plane of the tire.

17. The pneumatic tire of claim 16 wherein there are at least two plies of the cord reinforced elastomeric ply and the parallel cords in adjacent plies are inclined at equal angles but in opposing directions relative to the equatorial plane of the tire.

18. The pneumatic tire of claim 15 wherein the cords in the at least one cord reinforced elastomeric ply are parallel cords inclined at an angle of not more than 5° relative to an equatorial plane of the tire.

19. The pneumatic tire of claim 1 wherein the tire is further characterized by opposing bead portions and each bead portion comprises at least one reinforcing layer, in addition to any carcass reinforcing ply that extends between the opposing bead portions, wherein the at least cord reinforcing layer is comprised of cords formed from the blended composite filaments and treated with an adhesive having a cure set temperature greater than 470° F. (243° C.).

* * * * *